F. OGDEN.
Grain Binder.

No. 238,302.   Patented March 1, 1881.

Fig. 6.

Witnesses.   Inventor.
Jno. Crowell Jr   Ferris Ogden
W. E. Donnelly   By Leggett & Leggett
   Attorneys 8 Sheets—Sheet 5.

F. OGDEN.
Grain Binder.

No. 238,302. Patented March 1, 1881.

Attest:
H. L. Pennie
A. W. Bright.

Inventor:
Ferris Ogden.
By Leggett & Leggett.

F. OGDEN.
Grain Binder.

No. 238,302.  Patented March 1, 1881.

Attest:
H. L. Perrine
A. W. Bright

Inventor
Ferris Ogden.
By Leggett & Leggett.

F. OGDEN.
Grain Binder.

No. 238,302. Patented March 1, 1881.

Attest:
H. L. Pennie.
A. W. Bright.

Inventor.
Ferris Ogden.
By Leggett & Leggett.

UNITED STATES PATENT OFFICE.

FERRIS OGDEN, OF MANSFIELD, OHIO, ASSIGNOR TO HIMSELF, M. D. HARTER, H. M. WEAVER, AND HUNTINGTON BROWN, OF SAME PLACE.

GRAIN-BINDER.

SPECIFICATION forming part of Letters Patent No. 238,302, dated March 1, 1881.

Application filed August 20, 1879.

*To all whom it may concern:*

Be it known that I, FERRIS OGDEN, of Mansfield, in the county of Richland and State of Ohio, have invented certain new and useful Improvements in Grain-Binders; and I do hereby declare the following to be a full, clear, and exact description of the invention, such as will enable others skilled in the art to which it pertains to make and use it, reference being had to the accompanying drawings, which form part of this specification.

My invention relates to grain-binders designed for attachment to and operation in connection with reapers and harvesting-machines; and it consists in certain details of construction and combinations of parts in a grain-binder, as will be hereinafter described, and pointed out in the claims.

My binder may be separated, for convenience of description, into the following devices: first, the primary driving mechanism; second, the receiving bed or table; third, the binder-arm and its attached and adjacent parts, and, fourth, the knot-tying and cutting apparatus.

The different functions of my device are preferably performed in the following order and concert: Grain or straw is taken by the action of the rakes upon the receiving-table, which, when full, operates to throw into gear and operation the driving mechanism of the binder-arm and knot-tying apparatus. These two latter mechanisms, however, do not operate simultaneously. The binder-arm is first called into operation until it has received and carried a bundle to its position for binding, at which time the binding-cord has been passed around it. When this is done the binding-arm becomes stationary, or substantially so, and now the knot-tying device performs its functions and then stops. Meanwhile the table has returned for the reception of another bundle, and the arm backs down, delivers the tied sheaf, and continues its backward movement until it stands in position for a forward movement to grasp the next bundle, after which the operations just described are repeated.

The different parts of my device are supported by any suitable frame-work, A, which may be an independent structure, or which may be, if desired, part of the frame-work of the reaper or harvester.

B is a sprocket-wheel, although any equivalent form of wheel may be substituted. This wheel may be considered the primary driver, and it is kept constantly in motion by any suitable means.

Upon the shaft of the wheel B is rigidly attached a driving-pinion, B′. The shaft of these two wheels B and B′ is adapted to have a longitudinal motion in its bearings, whereby the pinion B′ may be thrown into or out of gear with the mechanism which it is designed to actuate.

Upon the outer face of the pinion B′ is formed a lug or spud, which, when the pinion is pushed outward, engages with a spud or lug, $C^5$, upon the mutilated gear-wheel C. These two lugs operate as lantern-teeth, for purposes which will hereinafter more fully appear.

C is a wheel having external and internal mutilated gears, and also provided upon its inner surface with a cam for imparting movement to the receiving bed or table, and upon its outer face provided with a crank pin or lug, which engages with a cam-slot in the arm of the segmental gear for driving the binder-arm.

C′ is the external mutilated gear; $C^2$, a plain surface, corresponding to the pitch-line of the mutilated gear C′.

$C^3$ is the internal mutilated gear; $C^4$, a section where the internal-gear teeth are removed; $C^5$, a lug or spud projecting inwardly from the face of the wheel C at the point $C^4$.

D is a cam upon the inner face of the wheel C. This cam engages with and operates the lever D′, which, by any suitable link or pitman connection, $D^2$, imparts a rocking or reciprocating movement to the receiving bed or table $D^3$.

$D^4$ are arresting-teeth projecting upward from the lower portion of the bed or table $D^3$. These teeth are rigidly affixed to a common shaft, $D^5$, to which shaft is also rigidly affixed a projection, $D^6$. This arm, by its movement due to the pressure of the grain upon the teeth $D^4$, engages with the lever $D^7$, which operates to throw into engaging position the driving-wheels B B′, and thus set into motion the inner grain-binding mechanism, and at the proper time to raise the oscillating grain-receiver, which is pivoted in such a manner relative to the journal of the binder-arm that when it is raised it operates to carry the grain therein contained toward the binder-arm and across its path when in operation, and thereby permit of the employment of a shorter binder-arm than could be used provided the grain-receiver were stationary.

I have shown in the present instance one effective form of device whereby the lever $D^7$ operates to drive outward the shaft of the wheels B B′ and throw them into gear, as before specified. I accomplish this object by forming a screw-thread upon the projecting end of the shaft of the wheels B B′ and forming at or near the end of the lever $D^7$ a section of a corresponding female screw-thread. It will thus be seen that when these two parts are brought into engagement by the action of the arm $D^6$ the wheel B′ will be moved outward to its engaging position with the internal gear of the wheel C. I do not, however, limit myself to this exact form of mechanism, because any device whereby the movement of the arm $D^6$, or its equivalent, will operate to govern the movements of the wheel C will be comprehended by my invention, and this may be performed in a variety of ways unnecessary to mention.

The wheel B, by any suitable connection, imparts movement to the shaft E, and this shaft E is bent into or provided with oppositely-moving cranks E′, which operate the feeding-rakes $E^2$. Guide-rods $E^3$, attached to the rakes $E^2$, serve to maintain said rakes in their proper presentation to the receiving-table $D^3$.

Coming now to a description of the binding-arm and its attached portions, it will be found that this mechanism is primarily operated by a wrist pin or lug, F, which I prefer making in the form of an anti-friction roller. This wrist-pin is attached to the outer face of the wheel C, and engages within the cam-slot F′ of the segmental gear $F^2$. The cam-slot F′ is formed, substantially as shown, to impart to the binder-arm its motion in a proper degree and at the proper time, as will hereinafter appear. The segmental gear is given an oscillating motion by the rotation of the wheel C, and this, in turn, imparts a to-and-fro rotary movement to the pinion $F^3$.

$F^4$ is a shaft suitably journaled to the frame A, carrying on one end a pinion, $F^3$, and upon the other the compressor $F^5$ and binder-arm $F^6$. The compressor is loosely attached to the shaft $F^4$ in such a manner as to allow of a free and independent rotary movement. A suitable stop, $F^7$, is provided to limit the fall of the compressor $F^5$, so that it will not at any time interfere with the receiving-table $D^3$ or its attached mechanism, and particularly so that it shall always be in position to receive the upper portion of the bundle held by the binding-arm $F^6$ as it moves upward toward the knot-tying mechanism.

$F^8$ is an impinging-spring, which bears against the compressor $F^5$ shortly after the binder-arm $F^6$ has proceeded upon its upward movement as it carries its bundle to be bound. By the impingement of the spring $F^8$ the compressor $F^5$ is held firmly down over the contained bundle, thus pressing it compactly together while the binding-string is being passed around and tied. The binding-arm is given a comparatively rapid movement until almost the moment of tying the binding-string, at which particular time its movement is slower. This is necessary on account of the increased resistance offered by the bundle. To effect this the slot F' is formed substantially as shown in the drawings, and when thus formed the greatest leverage, or the greatest advantage in the application of power, is exerted at the time when the bundle is most compact—that is, at the time when the knot of the binding-string is being tied or about to be tied. The binder-arm $F^6$ is preferably formed somewhat in the shape of a sickle-blade, and it carries a device for griping and releasing the end of the binding-cord. This griping and releasing mechanism is placed in the binding-arm at about two-thirds of its length, measuring from the shaft $F^4$. Any suitable griping and releasing device may be employed; but I have shown one that has proved effective. This form consists of two engaging gear-wheels, $F^9$, with laterally-projecting sections $F^{14}$, which extend outside the binder-arm $F^6$. These extended portions are toothed or roughened in such a manner as to firmly hold the string when placed between them. One of the griping-wheels $F^9$ is provided with an arm or extension, $F^{15}$, which, by impingement against the unlocking device $F^{10}$ and $F^{11}$, opens or separates the griping mechanism $F^9$ and releases the binding-string after said string has been received and is held by the knot-tying mechanism. The toothed portions $F^{14}$ are held in engagement with each other—that is to say, with the teeth of one meshing with the teeth of the other—by means of the sector-bar $F^{16}$, the teeth of which mesh with the teeth of one of the toothed wheels $F^9$. The sector-bar $F^{18}$ is attached to a yielding or spring bar, $F^{17}$, one end of which is securely attached to the binder-arm. Hence the string or cord is retained between the toothed surfaces of the toothed extensions $F^{14}$ by the force of the spring-bar $F^{17}$, and is released by means of unlocking devices acting upon the lateral extension $F^{15}$ in opposition to the force of the spring-bar.

Figure 1:
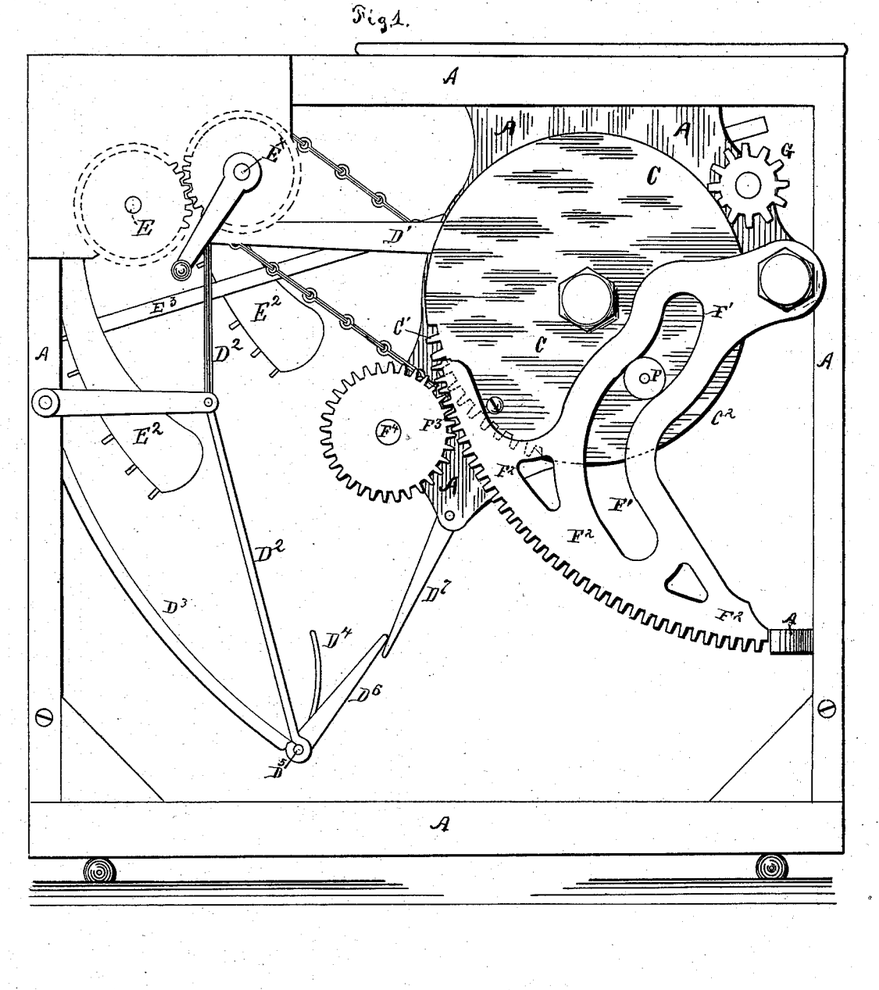
Figure 1 is a side elevation from the outside of my device, omitting the binder-hook and knot-tying mechanism.
Figure 2:
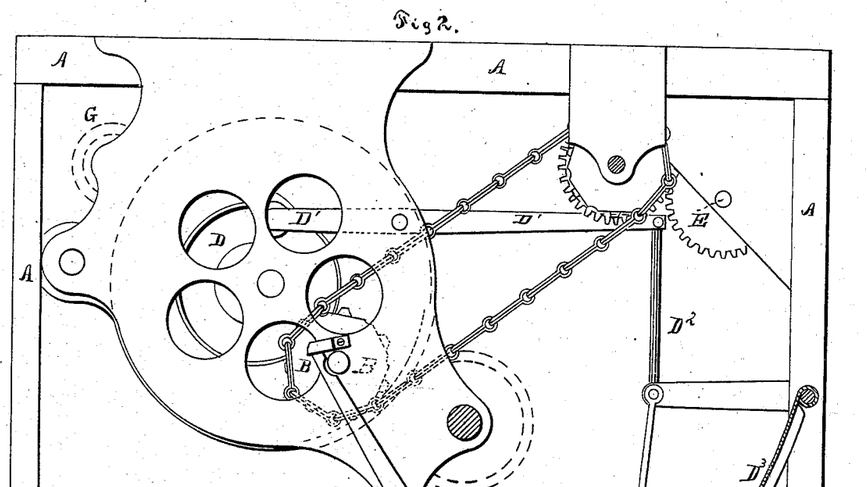
Fig. 2 represents a view of the reverse side of the mechanism shown in Fig. 1.
Figures 3, 4:
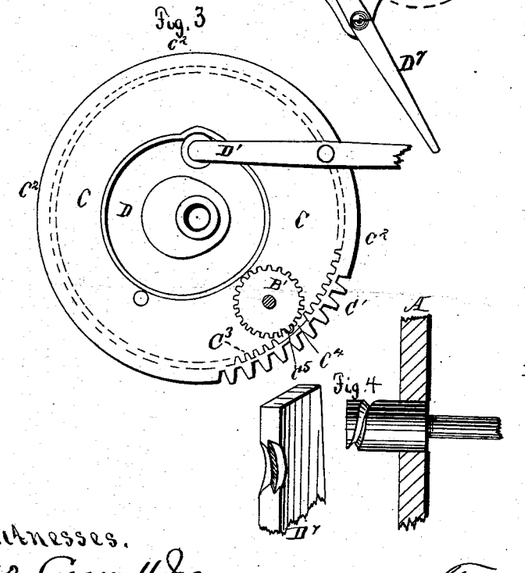
Fig. 3 shows a portion of the same with its casing removed.
Fig. 4 is a detached view, showing in detail the engaging end of the arm $D^7$ and the screw form of the revolving gear shifter, against which it impinges.
Figure 5:
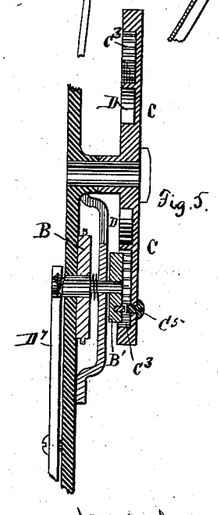
Fig. 5 is a longitudinal vertical section of a portion of the mechanism shown in Fig. 2.
Figure 6:
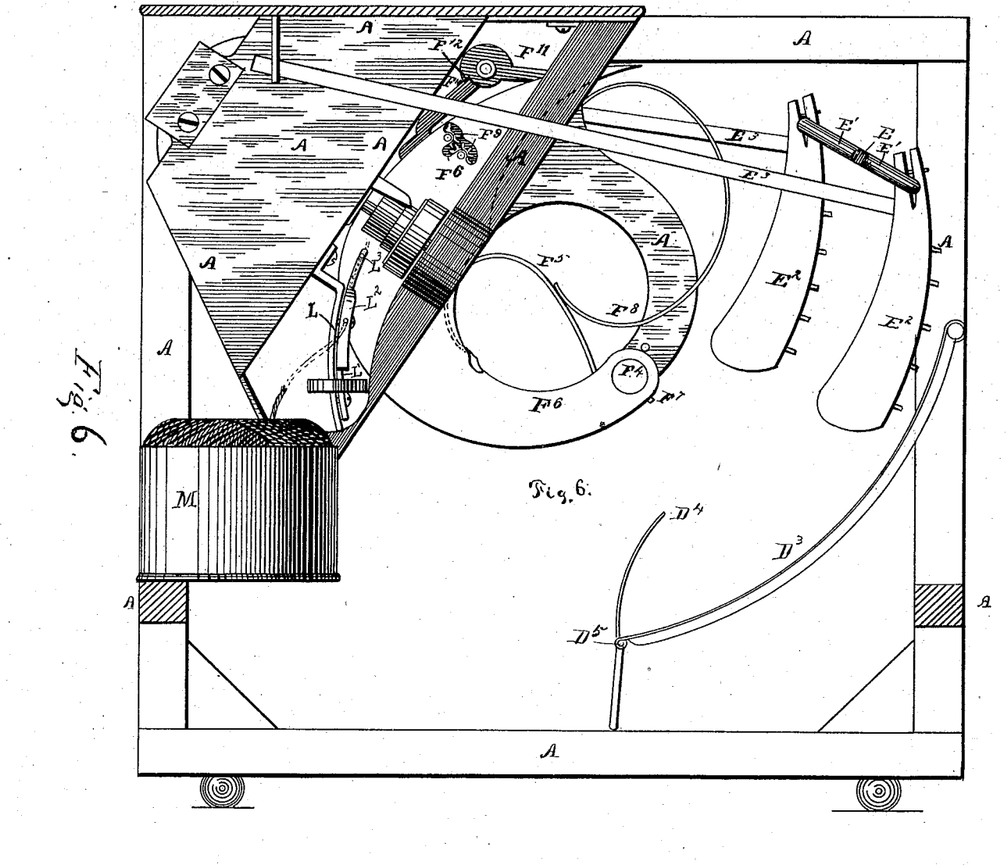
Fig. 6 is a view of my grain-binder, looking at it from the side where the knot-tying mechanism is located.

The unlocking device referred to consists of the two pieces $F^{10}$ and $F^{11}$, pivoted to the frame and formed substantially as shown in the drawings, Figs. 6. While at rest they present together an open jaw, into which the binder-arm $F^6$ enters in its forward movement. The upper piece, $F^{10}$, impinges against the extended arm $F^{15}$ of the griping device $F^9$ and opens it, meanwhile resting upon the upper surface of the binder-arm. The point of said binder-arm forces out the piece $F^{11}$ until it and the piece $F^{10}$ becomes substantially a solid single piece, on account of their locking together by the impingement of the stop $F^{12}$ against the piece $F^{10}$. After the said jaws are opened to the extreme limit, suitable springs acting upon the pieces $F^{10}$ and $F^{11}$ operate to return them to their normal position when pressure upon the binder-arm $F^6$ is removed.

I do not propose to be limited to the exact form of griping and releasing device $F^9$ here shown, as any pinching or grasping mechanism that can be operated to open and close at the time specified will suffice, and will be comprehended by my device.

It will be noticed that the compressor $F^5$ is so shaped that it is received upon the binder-arm $F^6$ on its upward passage. The binder-arm and compressor should engage with each other in sufficient time to prevent the dropping of the contained bundle from the binder-arm as it is carried up to the knot-tying mechanism.

One function of the binder-arm $F^6$ is to pass the binding-cord around the bundle, and this it does by first passing one end of the binding-cord about half-way around the bundle, and then, after grasping said bundle, turning the bundle itself until the cord is passed completely around it. After the binding-cord has been thus passed around the bundle the knot-tyer receives both ends and ties them in a single plain knot of the character shown in Fig. 14 of the drawings. The knot is tied while the binder-arm and compressor are at or near their extreme movement, and while the bundle is in its most compressed state, so that when discharged the expansion of the sheaf will tighten the binding-cord.

Another most important function performed by the binder-arm $F^6$ is the division of the grain or straw into gavels; for, be it remembered, the grain as it is cut is being continuously delivered upon the receiving-table, and the binder-arm, as it revolves through the slot in said table, separates and removes its gavel without interfering with or interrupting the reception of the grain meanwhile being cut and delivered. As the gavel is received by the binder-arm it is entirely removed from the receiving-table and from the grain or straw with which it was recently associated. This function is a great improvement over those forms of binders wherein the mass of grain or straw received upon the table $D^3$ is simply divided into bundles without said bundles being separated and carried off as divided, which results in a tangling of the straws and a consequent imperfection and uncertainty not only in the operation of the machine, but in the character and efficiency of the binding operation itself.

Figures 7, 8, 9, 10, 11, 12, 13, 14, 15:
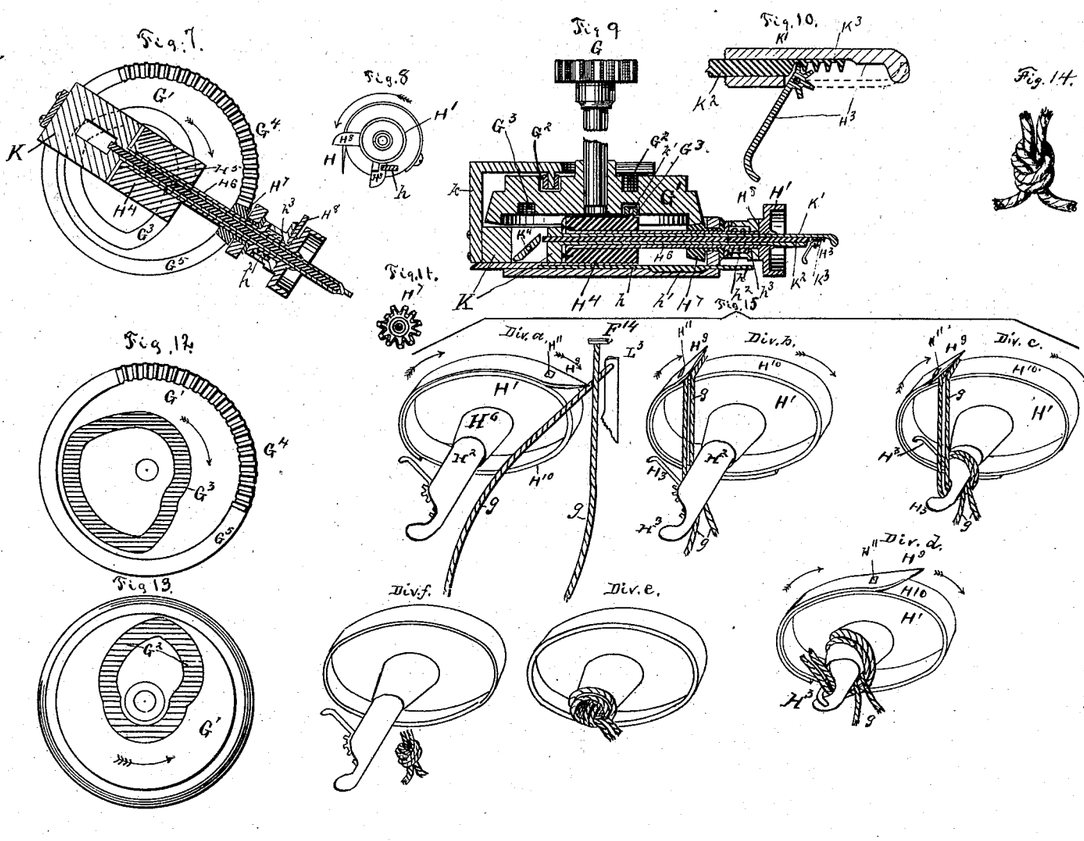
Fig. 7 is a detached longitudinal sectional view of the knot-tyer and a face view of its driving mechanism.
Fig. 8 is a detached face view of the knot-tyer and the string-cutter.
Fig. 9 is another sectional view of the knot-tying mechanism.
Fig. 10 is a detached and enlarged view, showing, in longitudinal section, the grasping-finger of the knot-tyer.
Fig. 11 is a detached view, showing a pinion with mutilated gear. One tooth is partially or wholly removed to provide at that point a locking-face. This pinion $H^7$ is for revolving the tube $K'$.
Fig. 12 is a view of one side of the combined cam and mutilated gear-wheel for operating the knot-tying mechanism.
Fig. 13 is a view of the opposite face of this wheel.
Fig. 14 shows the knot as tied by my device.
Fig. 15 embraces several views—viz., divisions $a, b, c, d, e$, and $f$, showing my knot-tyer in different stages of its operation.
Figures 16, 17, 18:
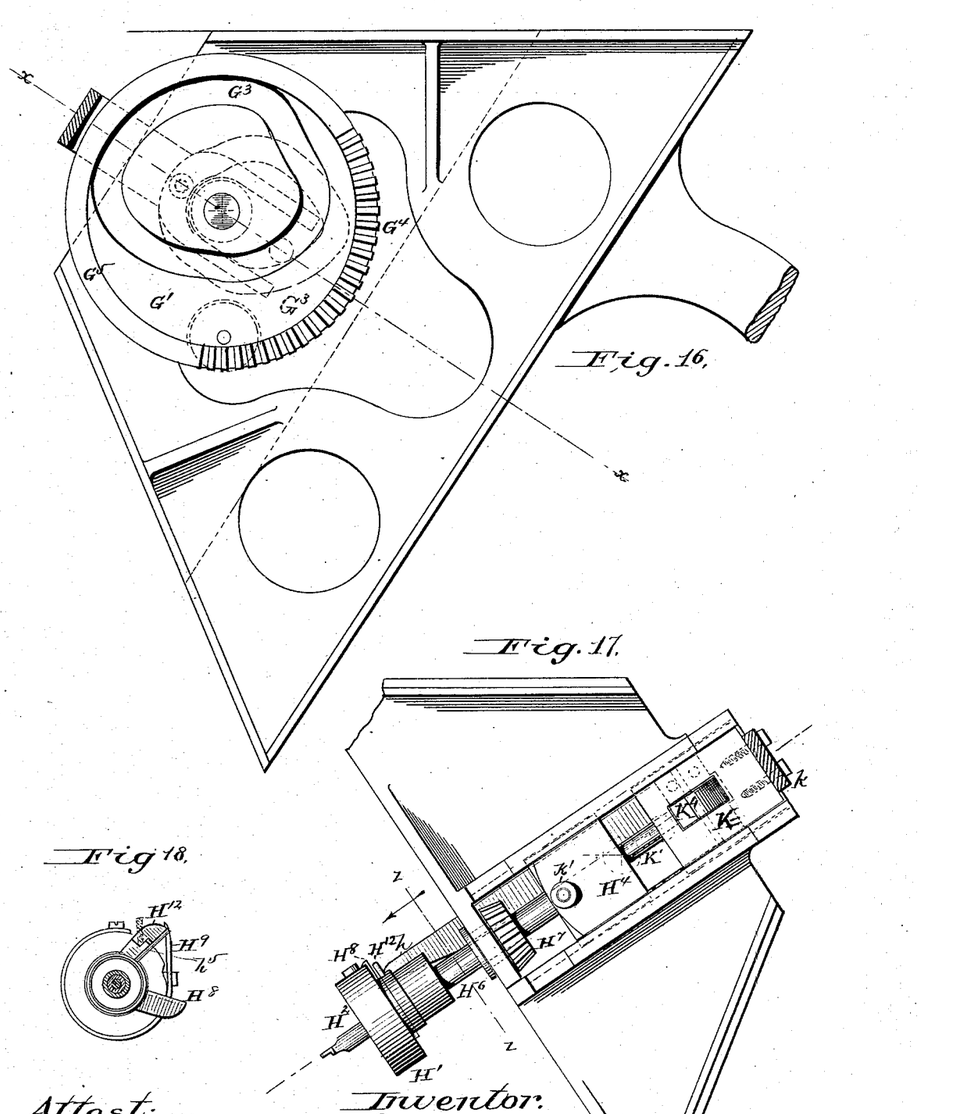
Fig. 16 is a side elevation of the driving mechanism of the knot-tyer, one side of the case being removed.
Fig. 17 is a side elevation of the knot-tyer when disconnected from the driving or actuating mechanism shown in Fig. 16.
Fig. 18 is a transverse section of the knot-tyer, taken through line $z\,z$ of Fig. 17.

Having now traced the gavel from where it is divided on the receiving-table and separated from the rest of the grain therein by the binder-arm $F^6$, and until it has been carried upward, its binding-cord passed around it and ready to be tied, I will now describe my mechanism for, and manner of, tying the knot of the binding-cord. The ends of this binding-cord have been brought together, as shown in Fig. 15, division $a$, and in this condition are received by the knot-tyer. The knot-tyer is designed to act intermittingly, and to this end the combination of the mutilated external gear, $C'$, with the mutilated pinion G, I have found to serve an effective purpose. The pinion G is fixed to a shaft, upon the opposite end of which is placed the cam and mutilated gear-wheel $G'$.

This cam and gear-wheel G' is, properly considered, a portion of the knot-tying apparatus. It consists, essentially, of two cams, $G^2$ $G^3$, mutilated bevel-gear $G^4$, and a locking-surface, $G^5$, formed on the pitch-line of the gear-teeth $G^4$. The gear $G^4$ should be sufficient to impart exactly two revolutions to the knot-tyer, and the function of the locking-surface $G^5$ is to prevent a revolution of the knot-tyer excepting when operated upon by the gear $G^4$. The function of the cam $G^2$ is to impart movement to the shaft or stem carrying the jaws or nippers of the tying apparatus, while the function of the cam $G^3$ is to impart motion to the thimble and collar surrounding said jaws or nippers, as will hereinafter more fully appear in the description of the knot-tying apparatus proper, which I will now give. This knot-tyer consists, essentially, of a pair of jaws or nippers adapted to open and close in receiving and delivering the cord; second, in a carrier adapted to revolve about said nippers or jaws for passing the cord twice around said jaws; third, in an apparatus for cutting the cord when the knot is tied. The first step consists in drawing the ends of the band $g$ beneath the spring-finger $H^9$, as shown in division $a$ of Fig. 15. One end of this cord is drawn beneath the finger by the movement of the binder-arm, while the other is held stationary and brought beneath said finger by its (the finger's) revolution against it. The second step, as illustrated in division $b$, is accomplished by the revolution of the collar H', and this is the partial coiling of both ends of the band $g$ around the stem $H^2$ behind the jaws or nippers $H^3$. This completes the second step. The third step is accomplished by the moving forward of the collar H' upon the stem $H^2$ while it is revolving about said stem. As the collar moves forward it carries with it the ends of the band $g$, winding them around the stem $H^2$, between the jaws $H^3$, so that the parts are in the position shown in division $c$ of Fig. 15. At this stage the shears operate to cut the cord, and the jaws $H^3$ are closed, as shown in division $d$ of Fig. 15. The next step consists in the withdrawal of the stem $H^2$ and the jaws $H^3$ within the collar H', as shown in division $e$ of Fig. 15. This completes the knot. Division $f$ of Fig. 15 shows the last step, which consists in the projection of the stem $H^2$ with the jaws or nippers $H^3$, the opening of said jaws, and the delivery of the knot. This describes the operation of the device.

In Figs. 7, 9, 17, and 19 will be seen two blocks, $H^4$ and K, fitting and adapted to slide longitudinally within a suitable stationary frame or guide. Block $H^4$ is provided with a recess, $t$, in its rear end, in which is located a disk or collar, T, rigidly secured to the rear end of the tube $H^6$, a plate, $t'$, being attached to the rear end of the block to prevent the displacement of the collar T. Thus the block $H^4$ carries the tube $H^6$, the latter being free to revolve therein. Tube $H^6$ is formed with a groove, $t^2$, within which fits a feather, $t^3$, on the bevel-pinion $H^7$, by which the tube is revolved and at the same time allowed to reciprocate within said bevel-pinion.

Figure 19:
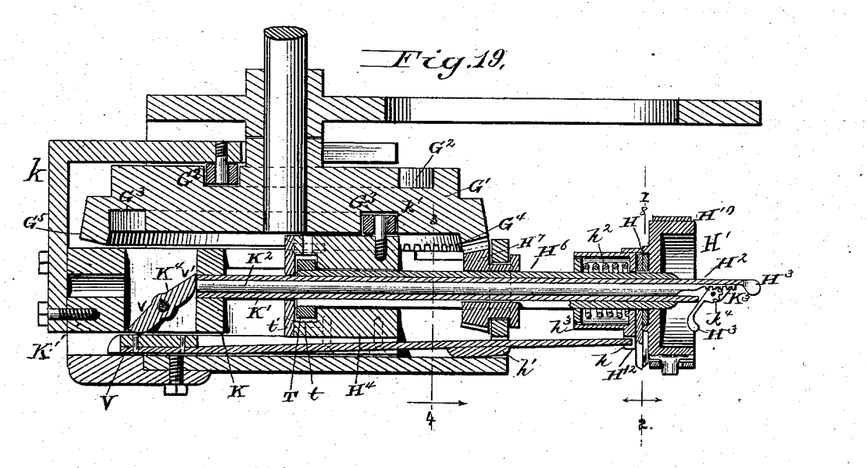
Fig. 19 is an enlarged view, in longitudinal section, of the knot-tying mechanism.
Figure 20:
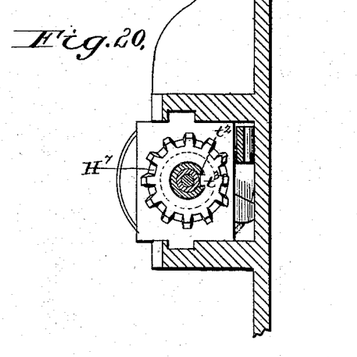
Fig. 20 is a transverse section taken through line 3 4 in Fig. 19.
Figure 21:
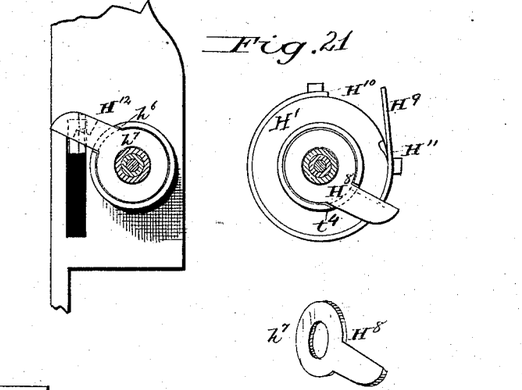
Fig. 21 represents views in transverse sections, looking in opposite directions, taken through line 1 2 of Fig. 19, and also a detached view of one blade of the string-cutter.

To the outer end of tube $H^6$ is rigidly secured a head, H', to the rear face of which is secured the shear-blade $H^8$, a notch, $t^4$, being formed in the head for the reception of the blade, and for preventing its rotary displacement. Rotary head H' is also furnished with a finger, $H^9$. The other shear-blade, $H^{12}$, is adapted to revolve in the circle concentric with the axis of the tube $H^6$. It has a small projection, $h^5$, extending from its side, with which engages the end of finger $h$ at certain intervals of time, which serves to hold the shear-blade $H^{12}$ in a stationary position while the other shear-blade, $H^8$, is rotated. Finger $h$ is formed of spring plate metal and rigidly secured to the block $H^4$, the tension of the spring-finger tending to move the free end thereof away from the shear-blade $H^{12}$. The body portion of finger $h$ is provided with a cam-shaped supporting-block, $h'$, which is secured to the under side of the finger and rests upon the casing of the tying mechanism, as illustrated in Fig. 19, and when in this position the finger is reciprocated with the block $H^4$, and its end is in engagement with the side projection, $h^5$, on the shear-blade $H^{12}$, thus serving to retain the latter in a stationary position while the other shear-blade $H^8$ revolves and severs the cord. Block $H^4$, together with finger $h$, continues to move outwardly from the case, and when the cam-shaped block $h'$ leaves the casing the end of the finger is thrown outward by the springing action of its body portion, thereby releasing its end from the shear-blade $H^{12}$. The shear-blades $H^8$ and $H^{12}$ are retained in proper juxtaposition with each other, or forced against each other under sufficient pressure to insure a proper cutting action by means of a spring, $h^2$, which acts to force the thimble $h^3$, which is connected with the shear-blade $H^{12}$, toward the shear-blade $H^8$. In this connection I would state that the lug or extension against which the finger $h$ shall impinge in stopping the motion of the loosely-attached shear-blade $H^{12}$, as heretofore specified, may be either a portion of the blade, as before mentioned, or a portion of the thimble $h^3$. For many purposes I prefer that this lug or projection shall be a portion of the thimble, as by this construction the blade is simplified and made more cheap and easy of construction and repair. The blade $H^{12}$ rests within a notch, $h^6$, formed in the end of the thimble $h^3$, whereby the blade is retained in place. The spring $h^2$ will permit of a slight back movement of the thimble $h^3$, to allow of the withdrawal of either or both of the blades $H^{12}$ $H^8$, both of which blades are formed with an annular shank, $h^7$.

Beyond the shear-blades is placed a spring-finger, $H^9$, formed and attached substantially as shown in the drawings. The free end of this finger terminates in a point or nose projecting from the collar $H^{10}$ at a tangent, and it is beneath this finger, between it and the periphery of the collar $H^{10}$, that the terminals of the applied band are held during the tying of the knot. A stop, $H^{11}$, is furnished to prevent the binding-string passing too far back beneath the finger $H^9$. This stop also serves as a stay or brace to prevent the displacement of the finger.

Behind the block $H^4$ is another block, K, to which is rigidly attached a tube, K', which latter passes through the entire length of tube $H^6$.

Within the tube K' is located the stem $K^2$, furnished on its outer end with a rack, $K^3$, which engages a segmental gear, $K^4$, on the shank of one of the jaws or nippers $H^3$. Hence by reciprocating the stem $K^2$ the jaws or nippers $H^3$ are opened or closed. The tube K', to the outer ends of which are connected the jaws $H^3$, fits closely within the tube $H^6$, so that when it is drawn within said tube $H^6$ the nippers or jaws are thereby closed.

Figure 22:
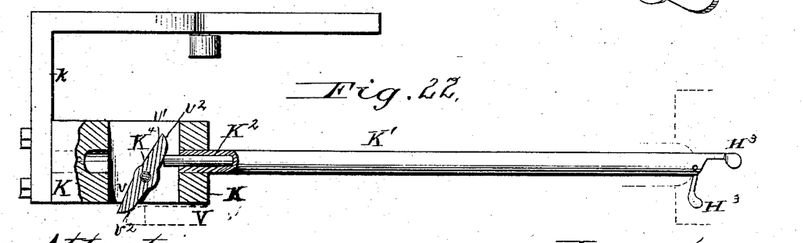
Fig. 22 is a detached view, partly in side elevation and partly in section, of a portion of the knot-tying mechanism.

Within the rear portion of block K is pivoted the trigger $K^4$, the latter being formed with two arms, $v$ $v'$, each being curved, as shown at $v^2$. When the stem is forced to the limit of its outward movement, the jaws or nippers $H^3$ are in an open position, and are securely retained in such position by means of the trigger $K^4$, the arm $v'$ of which is seated against the rear end of the stem, and the other arm, $v$, thereof being supported upon the rear end of the finger-plate, or upon a supporting-block, V, secured upon said plate. In this position the trigger is prevented moving in either direction, and thereby serves as a lock to prevent any movement of the jaws or nippers $H^3$. When the block $H^4$, together with the finger $h$, is moved outward, the supporting block or plate V is moved from beneath the arm $v$ of the trigger $K^4$, as illustrated in Fig. 22, thereby allowing the stem $K^2$ to be retracted and the jaws or nippers $H^3$ to be closed by being drawn into the incasing-tube $H^6$. The block K and parts connected therewith are actuated by the cam $G^2$ of the wheel G', through a suitable connecting-piece, $k$, and the block $H^4$ and its attached parts are actuated by the cam $G^3$ of the wheel G', (by the engagement of a pin and roller, $k'$, in the cam-groove $G^3$,) and also through the engagement of the mutilated gear $G^4$ and mutilated bevel-pinion $H^7$.

In conclusion, I come to the string-holder and tension device. The main functions sought to be obtained in this portion of my invention are, first, and chiefly, a proper presentation and tension of the cord as it comes from the ball; second, an automatic adaptation of the string-holder and the tension mechanism to the binder-arm and its contained nippers or griping devices for grasping and tying the binding-cord.

L is a supporting-frame for the string-feeding and tension mechanism, to which is attached a plate, L', the latter being formed with slots $w$ $w'$, through which extend the screws or bolts $w^2$. This method of securing the plates L' to the frame L permits the plate to move freely toward and from the binder-arm, and also to have a swinging movement in a vertical plane. A spring, $L^4$, is attached at one end to the frame L, and at its opposite end bears against the lower end of plate L', the spring serving to force the lower end of the plate toward, and at right angles to, the binder-arm. The upper portion of plate L' is formed with a groove, $l'$, in which rests, and through which passes, the binding cord or string under pressure of the free end of the tension-spring $L^2$, one end of which is secured to the outer edge of plate L'. The upper end of plate L' is provided with a perforated nose, $L^3$, through which the binding-cord passes from the tension-groove $l'$.

Figure 23:
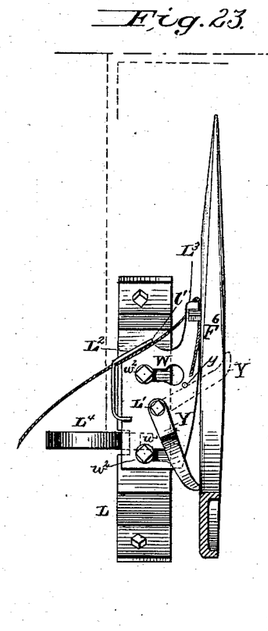
Fig. 23 is a rear elevation of the binder-arm and cord-retaining devices, showing the position of parts when the string is seized by the griping device on the binder-arm.
Figure 24:
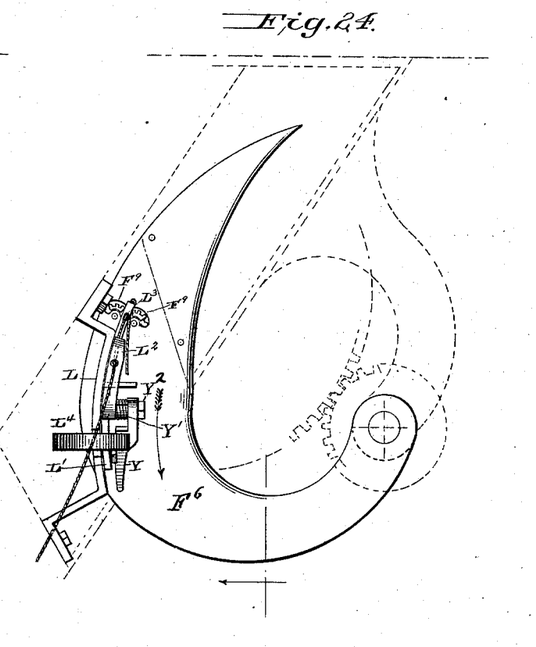
Fig. 24 is a side elevation of the parts illustrated in Fig. 23.
Figure 25:
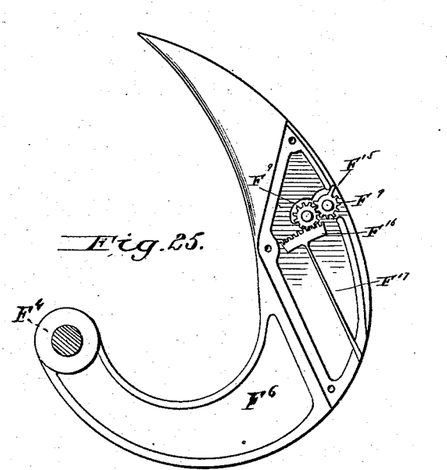
Fig. 25 is a side elevation of the griping device in the binder-arm.
Figure 26:
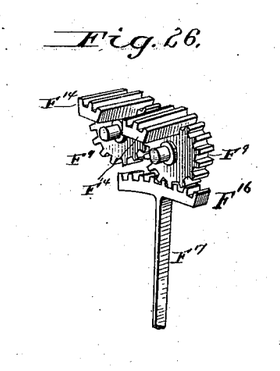
Fig. 26 is a view, in perspective, of the griping device.
Figure 27:
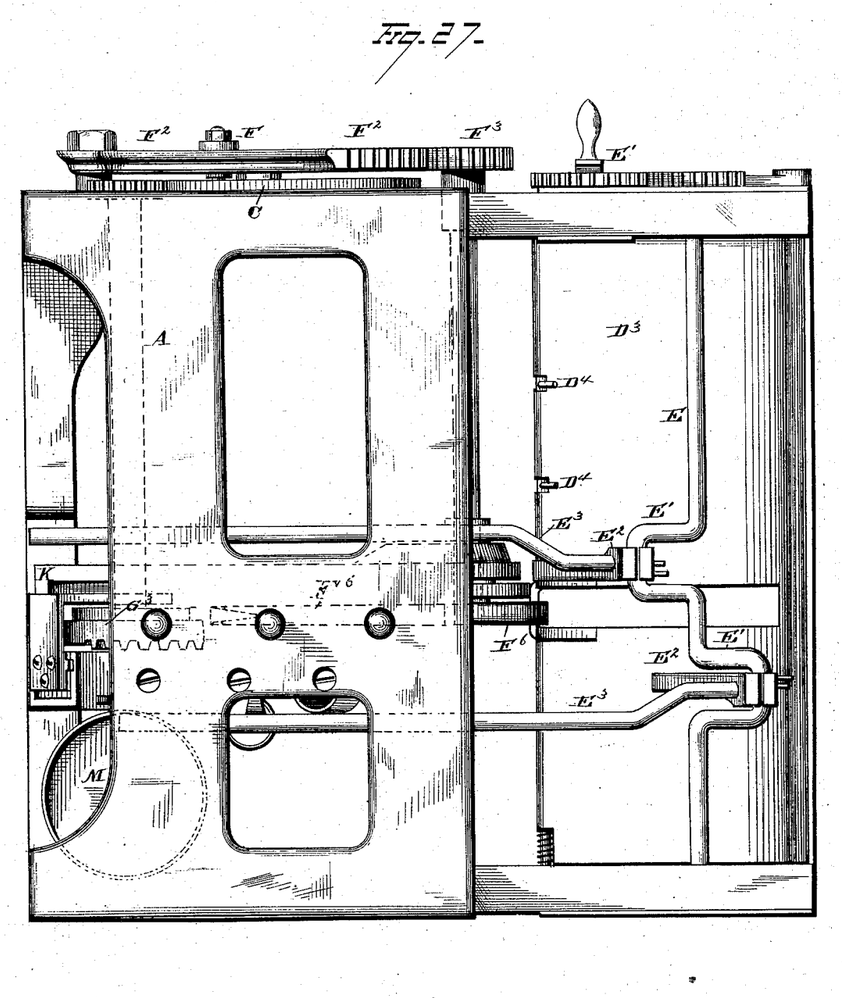
Fig. 27 is a plan view of the machine.

To the face of plate L' is pivoted an arm, Y, a spiral spring, Y', being placed upon the pivotal pin $Y^2$, one end of the spring being secured to the plate L' and its opposite end to the arm Y. Plate L' is furnished with a stop-pin, $y$, to prevent the rotation of arm Y. After the binding-cord has been severed, as hereinbefore described, the binder-arm is carried backward part of a revolution, and as it moves backward its rear edge engages with the arm Y, which latter, being pivoted to the plate L', serves to draw the latter toward the binder-arm, and the perforated nose $L^3$, through which extends the severed end of the cord or string, is forced in close contact with the side of the binder-arm. The perforated nose $L^3$ is arranged and constructed to force apart the toothed or serrated portions $F^{14}$, forming the nippers or gripers, and cause the latter to travel on opposite sides of the inner edge of the plate L' in the backward movement of the binder-arm, thereby drawing the free end of the cord between the gripers, which close and grasp the cord when free from the plate L'. The action and relative position of the parts last described are illustrated in Figs. 23 and 24 of the drawings.

M is a cup or any suitable receptacle for holding a ball of binding-cord. It is preferably constructed to hold the ball firmly without danger of displacement, and in such a manner that the cord can be drawn from the center of the ball.

What I claim is—

1. In a grain-binder, the combination, with the binding-arm and compressor, of an oscillating concave grain-receiver, arranged adjacent to said arm, its curve being practically coincident with the path of the arm, and mechanism, substantially as described, for automatically raising the free end of said grain-receiver and moving it toward the binding and compressing arm at certain intervals of time, substantially as set forth.

2. In a grain-binding machine, the combination, with a binding and compressing arm, of an oscillating grain-receiver and a rock-shaft journaled in the free end thereof, said rock-shaft carrying arms against which the grain is fed, substantially as and for the purposes described.

3. In a grain-binding machine, the combination, with the binding-arm and compressor and yielding arms connected with the oscillating grain-receiver, of an internally-mutilated gear-wheel, C, provided with a spud, $C^5$, the pinion B', secured to a shaft having a screw-thread formed on one end thereof, engaging lever $D^7$, provided with a section of a screw-thread, which engages with the thread on said shaft and moves it endwise in one direction, and a spring for moving the shaft in the opposite direction, substantially as set forth.

4. In a grain-binding machine, the combination, with the mutilated gear-wheel C, provided with the face-cam D, of an oscillating grain-receiving table and intervening mechanism for automatically raising said table during a portion of the stroke of the cord-carrying and compressing arm, substantially as set forth.

5. In a grain-binding machine, the combination, with an oscillating grain-receiving table and a crank attached to the shaft thereof, of a lever, D', carrying an anti-friction roller on its short end, a face-cam, D, and connecting-rods $D^2$, substantially as and for the purposes shown.

6. In a grain-binder, the combination, with the pinion $F^3$, attached to the shaft of the binding and compressing arm, of the mutilated gear-wheel C, and mechanism, substantially as described, for oscillating the grain-receiving table, and wrist-pin F, segmental gear $F^2$, pivoted at one side of the gear-wheel C, said segmental gear provided with the cam-slot F', substantially as set forth.

7. In a grain-binder, the combination, with the internally-mutilated gear-wheel C, pinion B', and mechanism, substantially as described, for automatically throwing pinion B' into engagement with mutilated gear $C^3$ when the desired amount of grain has been fed to the oscillating grain-receiving table, of the peripheral cog-section C' on wheel C, and mutilated pinion G, attached to the shaft of the knot-tying mechanism, substantially as set forth.

8. In a grain-binding machine, the combination, with the mutilated gear-wheel C, of the segmental gear $F^2$, for operating the arm $F^6$, peripheral cog-section C', and mutilated pinion G, for operating the knot-tying mechanism, and face-cam D and connecting mechanism for actuating the grain-receiving table, substantially as and for the purpose shown.

9. The master-wheel C, provided with the wrist-pin F, for actuating the mechanism of the binding-arm, also provided with the mutilated gear C' and locking-surface $C^2$, for imparting suitable movements to the knot-tying apparatus, also provided with the cam D, for actuating the grain-receiving table, in combination with a driving-pinion, B', constructed to impart at suitable intervals rotation to the said master-wheel C, the whole so constructed, combined, and adapted to operate that by and during a single revolution of said master-wheel the complete functions of the various mechanisms actuated by it are accomplished, substantially as and for the purpose shown.

10. The combination, with the binding and compressing arm, of the intermeshing toothed wheels $F^9$ $F^9$, provided with elongated toothed sections $F^{14}$ $F^{14}$, segmental rack $F^{16}$, and spring-shank $F^{17}$, substantially as set forth.

11. The combination, with the binding and compressing arm, of the toothed wheels $F^9$ $F^9$, provided with toothed sections $F^{14}$ $F^{14}$, one of said wheels being furnished with the projection $F^{15}$, and the stops $F^{10}$ $F^{11}$, substantially as set forth.

12. The combination, with the sliding block $H^4$, the cam for reciprocating the same, and revolving tube $H^6$, connected with said block $H^4$, of the sliding block K, tube K', attached thereto, said tube having jaws or nippers $H^3$ connected with its outer end, and reciprocating stem $K^2$, provided with a rack, $K^3$, which engages with a segmental gear on one of the jaws $H^3$, substantially as described.

13. The combination, with the reciprocating and revolving tube $H^6$ and hollow head attached to the outer end thereof, of a spring-pressed thimble and a pair of shear-blades, one adapted to rotate in unison with tube $H^6$, and the other to be held stationary at certain intervals of time, substantially as set forth.

14. The combination, with tube $H^6$ and head H', provided with nose $H^9$, of the tube K', provided with jaws $H^3$, stem $K^2$, a mutilated gear provided with cam-grooves in its opposite sides, and sliding blocks K and $H^4$, substantially as set forth.

15. The combination, with the sliding block $H^4$, tube $H^6$, rotary shear-blade $H^8$, and loosely-journaled shear-blade $H^{12}$, of the finger h, secured to sliding block $H^4$, said finger provided with cam-shaped plate h', substantially as set forth.

16. The combination, with the sliding block K, tube K', and stem $K^2$, of the trigger $K^4$ and supporting-plate V, attached to finger h, substantially as set forth.

17. The combination, with the binding and compressing arm, of the plate L', provided with slots, through which are inserted fastening-screws, and spring $L^4$, for forcing said plate toward the side of the binder-arm, substantially as set forth.

18. The combination, with the wheels $F^9$ $F^9$, having elongated toothed sections $F^{14}$ $F^{14}$, which latter project from the side of the binding and compressor arm, of the plate L', provided with a perforated nose, and a yielding arm, Y, pivoted to said plate, and adapted to operate substantially as set forth.

In testimony whereof I have signed my name to this specification in the presence of two subscribing witnesses.

FERRIS OGDEN.

Witnesses:
JNO. CROWELL, Jr.,
WILLARD FRACKER.